United States Patent [19]
Shabaker et al.

[11] Patent Number: 5,421,842
[45] Date of Patent: Jun. 6, 1995

[54] HIGH ENERGY LEVEL IN SITU ATTRITION AND BREAK UP OF CATALYST TO MAINTAIN BED FLUIDIZATION DURING HIGH TEMPERATURE OPERATIONS

[75] Inventors: Robert H. Shabaker, Chatham, N.J.; Charles A. Euker, Jr., Baton Rogue, La.; Geoffrey R. Say, Baton Rogue, La.; Gerald A. Wilcox, Baton Rouge, La.; James H. Taylor, Baton Rouge, La.; LeRoy R. Clavenna, Baton Rouge, La.

[73] Assignee: Exxon Research and Engineering Company, Florham Park, N.J.

[21] Appl. No.: 301,209

[22] Filed: Sep. 9, 1994

[51] Int. Cl.$^6$ ............................................. C01B 3/44
[52] U.S. Cl. .................................. 48/198.6; 48/197 R; 48/198.7; 48/198.8; 252/373
[58] Field of Search .................. 48/198.5, 198.6, 198.7, 48/198.8, 198.1, 197 R, 214 A, 215; 252/373; 423/418.2, 601, 602, 653, 654

[56] References Cited

U.S. PATENT DOCUMENTS

| | | | |
|---|---|---|---|
| 2,482,866 | 9/1949 | Phimmey | 48/198.7 |
| 3,124,291 | 6/1992 | Bremer et al. | 502/21 |
| 4,726,913 | 2/1988 | Brophy et al. | 252/373 |
| 4,877,550 | 10/1989 | Goetsch et al. | 252/373 |
| 5,356,845 | 10/1994 | Clavenna et al. | 48/198.7 |

Primary Examiner—Peter Kratz
Attorney, Agent, or Firm—Llewellyn A. Proctor; Jay Simon

[57] ABSTRACT

A process for the in situ attrition and break up of an agglomerating, or agglomerated catalyst to maintain and control the fluidization characteristics of a bed wherein low molecular weight hydrocarbons, oxygen and steam are contacted with the bed to produce hydrogen and carbon monoxide via both partial oxidation and steam reforming reactions. The feeds are injected into the reaction zone with mechanical energy input sufficient to balance the intrinsic rate of agglomeration by fracturing and breaking apart in situ the agglomerated catalyst to maintain the fluidization characteristics of the bed throughout the cycle of operation.

19 Claims, 1 Drawing Sheet

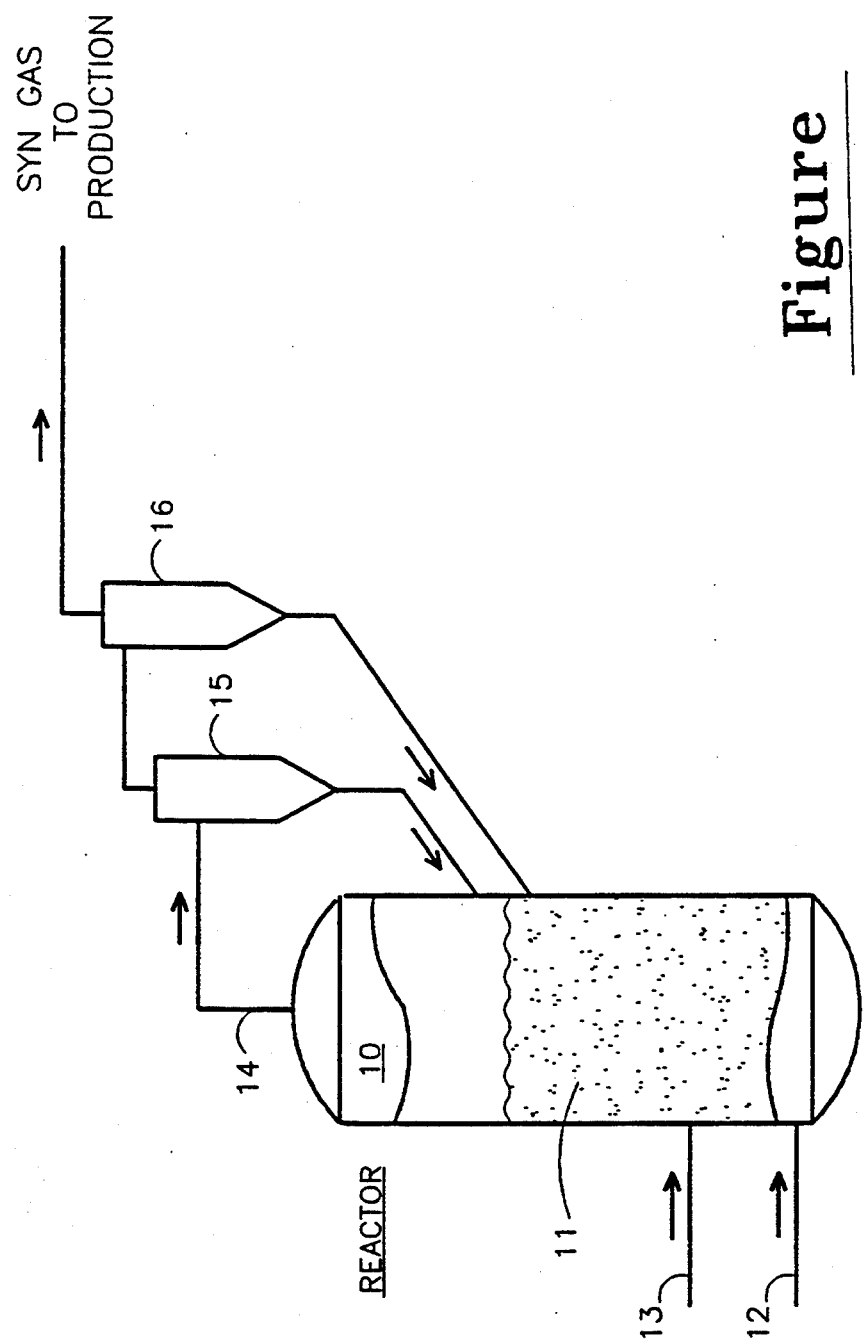
Figure

HIGH ENERGY LEVEL IN SITU ATTRITION AND BREAK UP OF CATALYST TO MAINTAIN BED FLUIDIZATION DURING HIGH TEMPERATURE OPERATIONS

FIELD OF THE INVENTION

This invention relates to a process for the in situ attrition and break up of an agglomerating, or agglomerated catalyst to maintain the fluidized characteristics of a bed wherein a low molecular weight hydrocarbon feed is converted to hydrogen and carbon monoxide in the presence of steam and oxygen. The in situ attrition is carried out during the operation by control of the mechanical energy level input of the feed to the process.

BACKGROUND

Fluidized bed processes are known to provide superior heat and mass transfer characteristics as contrasteel with fixed bed processes. They permit substantially isothermal reactor conditions in conducting both exothermic and endothermic reactions.

For example in the production of synthesis gas (hydrogen and carbon monoxide), low molecular weight hydrocarbons, e.g., natural gas (primarily $CH_4$), are fed into the bottom of a reactor containing a mixture of catalyst, e.g. a nickel-on-alumina catalyst, and a solids diluent, e.g., alumina, to form a fluidized bed of the catalyst and the solids diluent. Steam is introduced into the reactor. Oxygen is fed into the fluidized bed through nozzles separate from those through which the natural gas is fed. The oxygen reacts with a portion of the natural gas in a zone near the oxygen inlet according to the following partial oxidation reaction:

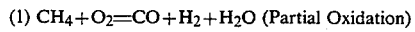

(1) $CH_4 + O_2 = CO + H_2 + H_2O$ (Partial Oxidation)

This is a strongly exothermic reaction and produces localized hot spots and burning near the $O_2$ nozzle, or nozzles, the high temperature area around the $O_2$ nozzle constituting a burning zone. The natural gas that does not react directly with the $O_2$ ascends through the reactor where it undergoes a steam reforming reaction to produce hydrogen and carbon monoxide according to the following equation:

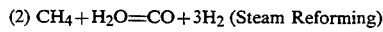

(2) $CH_4 + H_2O = CO + 3H_2$ (Steam Reforming)

The steam reforming is highly endothermic, but by having good solids circulation in the fluidized bed, the overall bed temperature becomes quite uniform. The net, or overall reaction (the sum of reactions (1) and (2), supra), described as follows, is slightly exothermic.

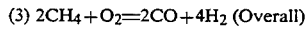

(3) $2CH_4 + O_2 = 2CO + 4H_2$ (Overall)

The overall reactions occur in a net reducing atmosphere.

The water gas shift reaction also occurs in the bed, a very rapid reaction which produces only minor heat effects.

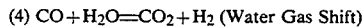

(4) $CO + H_2O = CO_2 + H_2$ (Water Gas Shift)

The exothermic heat of reaction produced by the oxygen causes burning and severe localized heat near the oxygen inlet zone; and despite the good heat transfer in the fluid bed, the high temperature produces net agglomeration of the catalyst, or catalyst and other solids. The high localized flame temperature produced by the oxygen in the burning zone of the bed can exceed the melting point of the alumina, or at least produce temperatures which cause the surface of the alumina particles to melt, stick and fuse together as the particles repetitively collide or recycle through the burning zone of the bed. The amount of agglomeration increases with time which adversely affects the fluidization characteristics of the bed, and the activity of the catalyst generally declines. The active catalytic sites can become inaccessible to the reactants due to the agglomeration. In addition, the overall increase in the average particle size of the fluidized bed produces larger bubbles in the bed; a phenomenon which causes further drop in the $CH_4$ conversion due to increased mass transfer resistance. As a result thereof the quality of fluidization becomes increasingly poorer and fluid bed temperatures become increasingly non uniform; qualities which decrease the amount of $CH_4$ conversion. In addition, reactor vibration can increase due to the poor fluidization characteristics; a phenomenon which can lead to a loss in the mechanical integrity of the equipment.

DESCRIPTION OF THE INVENTION

The present invention relates to improvements in a process for forming a syn gas, or reaction product mixture of hydrogen and carbon monoxide, from a hydrocarbon, or hydrocarbons, by contact thereof in a reaction zone with a fluidized solids bed of a particulate solids catalyst, e.g. a catalytic metal-on-alumina catalyst, or mixture of catalyst and a solids diluent, at net reducing conditions in the presence of steam and oxygen. In accordance therewith, the intrinsic agglomeration rate (which occurs as a function of several variables which include: reactor temperature, reactor pressure, the amount of oxygen ted into the reactor, the amount of steam or other diluents present, and the nature of the solids) is balanced by the particle attrition rate. A major, controllable contribution to the particle attrition rate is produced by input of the feeds at a total mechanical energy level sufficient to cause the particles to impact one against another and against reactor wall surfaces to break apart the agglomerated solid particles; particularly an early break up, and preferably continuous early break up, of the agglomerated solid particles which over an increasing period of time increase in density and become greatly strengthened and annealed by repetitive passes through the intense heat of the burning zone, or zone wherein the oxygen is injected; while yet avoiding the excessive production of fines in the reaction zone. Early break up of the newly formed, or forming agglomerates avoids the formation and strengthening of very large masses of agglomerated solids as occurs by repetitive passes of continuously agglomerating particles through the burning zone.

The catalyst, or mixture of catalyst and solids diluent, is preferably constituted of alpha alumina particles, the catalyst being constituted of nickel-on-alpha alumina. The solid catalytic particles of the fluidized bed are of great strength and high density, the strength and density of the solid particles increasing with time due to repetitive cycles of passage of the solids particles through the high temperature oxygen burn zone. The strength of the catalyst, or catalyst and solids diluent, can be expressed in terms of its Davison Attrition Index, D.I., a value directly related to the mechanical strength of the particle, a value which is generally less than about 6; most often ranging after about five days of continuous operation from about 1.5 D.I. to about 2.5 D.I., and more often, between about 5 and 15 days of continuous operation from about 0.5 D.I. to about 2 D.I. The tapped bulk density of the catalyst particles, after from about 2 to about 6 days of continuous operation, is generally greater than about 2.1 g/cc; and within from about 7 days to about 15 days of continuous operation, generally ranges from about 2.2 g/cc to about 2.3 g/cc, or greater.

The Davison Index, D.I., is determined by an attrition index method based on that developed by Davison Chemical Division of W. R. Grace & Company. The method uses a jet cup attrition technique that reports as the D.I. the wt% of $<20$ $\mu$m fines produced in a controlled attrition test. The D.I. test apparatus consists of two main vessels, the attrition vessel and the elutriation vessel. The attrition and elutriation vessels have diameters of 9 in. and 4.5 in., respectively. Each vessel is 24 in. high and has a cone shaped bottom that slopes about 15° from vertical. The jet cup attritor which holds the sample for attrition attaches to the bottom of the attrition vessel and is 1.03 in. I.D. by 2 in. deep. A 0.0625 in. diameter hole forms the jet that enters the cup's wall horizontally and is tangent to the inside wall and bottom of the cup. A sample 6±0.3 g is attrited for 20 minutes with $N_2$ (35% relative humidity) at a flow rate of about 21 Liters/minute, L/mm (this flow rate is fine-tuned to give a D.I. of 27±2 for a standard CZB-1 Davison catalyst). Fines (wt 1) escaping the attrition vessel are collected in an extraction thimble. After the attrition the sample is transferred to the elutriation unit to separate the remainder of the $<20$ $\mu$m fines from the sample. The sample is placed in a cup with similar dimensions to the jet cup but with a sintered metal distributor at the bottom to uniformly fluidize the sample in the elutriator. This cup with the attrited sample is connected to the bottom of the elutriator, and the sample is elutriated for 20 min with $N_2$ (35% relative humidity) at 9 L/min. The elutriation removes the $<20$ $\mu$m fines from the sample to give a remaining coarse fraction (wt 3). The elutriated fines (wt 2) are collected in an extraction thimble connected to the exit of the elutriation vessel. In a separate measurement, the wt% of $<20$ $\mu$m fines (% Pre Att) is determined in a fresh sample. The D.I. which represents the wt% of $<20$ $\mu$m fines formed by the attrition is calculated from the expression $$D.I. = \frac{\frac{[(wt\ 1) + (wt\ 2)]}{[(wt\ 1) + (wt\ 2) + (wt\ 3)]} * 100 - (\%\ Pre\ Att)}{100 - (\%\ Pre\ Att)} * 100$$

In conducting the process, a low molecular weight hydrocarbon feed, an oxygen Iced, carbon dioxide, steam, and diluent feeds are introduced into the fluidized bed of high strength/high density solids particles at mechanical energy input level ranging from about 2000 ft-lbs (foot-pounds) to about 6000 ft-lbs, preferably from about 3000 ft-lbs to about 5000 ft-lbs, per pound of oxygen fed into the fluidized bed, sufficient to attrit and break apart in situ the agglomerating, or agglomerated catalyst, or both the agglomerating catalyst and agglomerating solids diluent, and maintain throughout the cycle of operation a solids particle size distribution wherein from about 80 percent to about 95 percent or the solids particles, based on the total weight of the fluidized bed solids, range from about 20 microns to about 130 microns, preferably from about 30 microns to about 110 microns in diameter.

REFERENCE TO THE DRAWING

The FIGURE depicts, in schematic fashion, a preferred process for the practice of this invention.

DETAILED DESCRIPTION OF THE INVENTION

Referring to the FIGURE, synthesis gas is produced in reactor 10 containing a fluidized bed 11 wherein partial oxidation and steam reforming reactions are carried out simultaneously. The fluidized bed contains a solid catalyst, and generally also a particulate solids diluent to disperse heat, suitably high purity alpha alumina. Generally, the bed is constituted of from about 10 percent to about 99.9 percent, preferably from about 80 percent to about 99.5 percent, of the solid diluents component and from about 0.1 percent to about 90 percent, preferably from about 0.5 percent to about 20 percent, of the catalyst, based on the total weight of the particulate solids constituting the fluidized bed.

Hydrogen and carbon monoxide are formed by reaction between a low molecular weight hydrocarbon, or hydrocarbons, suitably a mixture of $C_1$-$C_4$ alkanes, predominantly methane, e.g., natural gas, steam, and oxygen, over a fluidized bed of nickel-on-an alumina based catalyst, or catalyst and solids diluent, at temperatures ranging from about 1500° F. to about 1900° F., preferably from about 1600° F. to about 1800° F., in a net reducing atmosphere.

The hydrocarbon is fed into the fluidized bed 11 of the reactor 10 via one or a plurality of lines, i.e. line 12, located at the bottom of the reactor, and oxygen or oxygen-containing gas is fed via a separate line or lines, i.e. line 13, at a location above line 12; a hot "flame" zone, or flame zones, being created at the locations wherein the oxygen enters the bed 11 via nozzle outlets, not shown, at the terminal end of the line or lines 13 where the line enters the bed 11. The very high heat melts the surface of some of the particles causing them to stick together as collisions occur. The agglomerating particles are also broken apart as they pass through the high velocity jets created by the entering feeds, and within the overhead cyclones. A hydrogen and carbon monoxide product, steam, carbon dioxide, some unconverted hydrocarbons, and other products exit overhead line 14, cyclone separators 15, 16 trapping some of the catalyst particles and fines, returning them via their respective diplegs to the fluidized bed 11 of the reactor. In terms of bed dynamics, at least about 80 percent by weight to about 95 percent by weight of the particles of the bed are of diameters ranging from about 20 microns to about 130 microns, preferably from about 30 microns to about 110 microns.

The hydrocarbon feed may be diluted, preferably with steam and/or carbon dioxide, and the mixture of hydrocarbon and diluent fed into the fluidized bed 11 via line 12; though all or a portion of the diluent could be introduced into the reactor 10 separately via a line, or lines, not shown. The total supply of oxygen to the process is preferably fed into the bed 11 via line 13; partial oxidation reactions occurring primarily near the oxygen inlet into the bed 11. The oxygen in particular, preferably, is diluted with steam and/or carbon dioxide to aid in moderating the heats of reaction which are quite intense at the point, or points, of entry of the oxygen. Suitably, sufficient steam, or steam plus carbon dioxide, is added to the oxygen to provide a molar ratio of diluent:oxygen, or steam:oxygen, ranging from about 0.1:1 to about 0.6:1, more preferably from about 0.3:1 to about 0.5:1. The partially combusted gas rises within the bed, passing through the flame zone, above which the unreacted hydrocarbon is reformed; the overall reaction taking place within the bed being only slightly exothermic to supply heat losses from the reactor walls.

The amount of particle attrition is a function of the amount of energy dissipated in the inlet nozzles to the bed, in the bed, and in the cyclones. At least about 70 percent, and preferably at least about 80 percent, of the total mechanical energy level input supplied to the fluidized bed of the reactor to break apart the agglomerating, or agglomerated particles and produce the desired net agglomeration, or required balance between the intrinsic rate of agglomeration and rate of particle attrition, is supplied by the hydrocarbon, oxygen and steam at the teed nozzle outlets at the points of entry of the feeds into the bed; with the balance of the energy being supplied by the gases rising within the reactor and that introduced into the cyclone, or cyclone separators; the latter supplying the preponderance of the energy as contrasted with that supplied by gases rising within the reactor. Generally, where the hydrocarbon and oxygen are both diluted with steam, about 70 percent to about 90 percent of the total mechanical energy input is supplied by a hydrocarbon/steam feed and oxygen/steam feed injected into the bed. Typically, about 80% of the total mechanical input energy is supplied at the hydrocarbon input nozzles by a mixture of hydrocarbon and steam, and about 10% of the total input mechanical energy is supplied at the oxygen input nozzles by a mixture of oxygen and steam. About 10% of the total input energy is supplied by the gas entering the cyclones; while that due to gases rising within the reactor above the level of the bum zone is essentially nil.

As the fluid solids pass through the localized hot spot near the $O_2$ nozzle, tire solids become quite hot and form a sticky surface which can cause particles to adhere to one another, thereby forming an agglomerate having a particle size larger than the original starting materials. The agglomerated particles then pass near the hydrocarbon feed nozzle where they experience a high mechanical energy input which results in particle breakage with the agglomerates becoming deagglomerated. The mechanical energy input into the hydrocarbon feed nozzles is held within a critical range. Too much mechanical energy input call result in excessive shattering of the particles which can lead to a high loss of fines overhead. Too low of a mechanical energy input, on the other hand, can result in the agglomerates not being broken apart. The mechanical energy imparted to the bed by the flowing gas is proportional to the mass of the gas and to the square of its velocity. By selecting the diameter and number of feed inlets, or nozzles, the velocity can be adjusted to provide the desired mechanical energy input from the required mass of gas. Since the thermal reactions which cause agglomeration increase with the amount of oxygen added to the reactor, the mechanical energy which breaks the agglomerates must also increase with the amount of oxygen added. Thus, the needed level of mechanical energy input can be expressed as the ratio of the energy to oxygen, i.e. foot pounds mechanical energy per pound of oxygen; an energy ratio expressed as ft-lb/lb$O_2$.

The catalyst employed in the practice of this invention is constituted of a refractory inorganic oxide carrier, or support, particularly alumina, and more particularly alpha alumina, composited with a metal, or metals, e.g., nickel, platinum, ruthenium or the like, catalytic for the production of hydrogen and carbon monoxide from low molecular weight hydrocarbons contacted with a fluidized bed of the catalyst at high temperature hydrothermal conditions. Preferably, the catalyst is a nickel-on-alumina catalyst, more preferably a nickel-on-alpha alumina catalyst. Suitably, the catalyst is stabilized with one or more of a lanthanum series metal, or metals, component, e.g. lanthanum, cerium, praseodymium, neodymium, etc. or mixture of these and other components. Preferably, the catalyst is mixed with a particulate refractory inorganic oxide solids diluent, preferably alumina, and more preferably alpha alumina, of particle size distributions corresponding to that of the catalyst, to form the fluidized bed of the reaction zone.

The preferred catalyst contains from about 1 percent to about 20 percent nickel, preferably from about 5 percent to about 20 percent nickel, composited with an alumina, preferably an alpha alumina support. The catalyst can be stabilized with one or more of a lanthanum series metal.

The invention, and its principle of operation, will be better understood by reference to the following example which illustrates specific and preferred embodiments.

EXAMPLE

Control of agglomeration anti attrition was accomplished in a large pilot plant reactor which provided a good simulation of a commercial unit. Natural gas and $O_2$ were ted to the reactor through separate feed nozzles. Each stream contained some steam diluent. In these examples the reactor was run at 1750° F. and at a pressure of 360 psia. The fluid bed reactor contained a nickel-on-alumina catalyst in admixture with an alumina diluent. Samples were taken from the bed and were analyzed by sonic sieve in order to determine the wt % agglomerates (taken as material greater than 90 microns.) The test periods ranged over about 7 to 10 clays in order to determine the rate of agglomeration with time. Reference is made to the Table.

Two separate runs were conducted, Run A and Run B. In Run A there were two periods of operation (Periods 1 and 2). In both periods of operation all of the key variables affecting the intrinsic agglomeration rate were held constant. This included the nature of solids in the bed, the amount of steam diluents, and the reactor temperature and pressure. The only change that occurred between Periods 1 and 2 of Run A was that the velocities of the feed nozzles were increased to change the mechanical energy input level. This caused the attrition to increase, which caused the observed particle growth above 90 microns, i.e., "net agglomeration," to decrease. As shown in Run A the net agglomeration rate was decreased by more than a factor of 2 between Periods 1 and 2.

Run B was a separate run with different solids in the fluid bed. In this run the energy input level was increased between Periods 3 and 4, with the result that the net agglomeration was reduced by a factor of about 4.

For Runs A and B, the loss rate of fines from the reactor increased only by about 20% as the energy input level was increased in order to reduce the net agglomeration.

TABLE

| Period | | Reactor Conditions | | Steam Diluents (In Hydrocarbon Feed Gas and In Oxygen) | Total Mechanical Energy Input[1] ft-lbs/lb of $O_2$ | Net Agglom Observed lbs of 90+/lb of $O_2$ | Solids Loss Rate |
|---|---|---|---|---|---|---|---|
| | | Temp, °F. | Pressure, psia | | | | |
| Run A | 1 | 1750 | 360 | BASE-A | $1.9 \times 10^3$ | $7.3 \times 10^{-4}$ | Base |
| | 2 | 1750 | 360 | BASE-A | $3.4 \times 10^3$ | $3.0 \times 10^{-4}$ | 1.2 × Base |
| Run B | 3 | 1750 | 360 | BASE-B | $3.0 \times 10^3$ | $7.2 \times 10^{-4}$ | Base |
| | 4 | 1750 | 360 | BASE-B | $4.1 \times 10^3$ | $1.8 \times 10^{-4}$ | 1.2 × Base |

[1] At least 70% of Total Mechanical Energy Input is generated by Hydrocarbon/Steam Feed Nozzles.

It is apparent that various modifications and changes can be made without departing the spirit and scope of the invention.

Having described the invention, what is claimed is:

1. In a process for the production of hydrogen and carbon monoxide by contact in a reaction zone at high temperature of a fluidized bed of a particulate solids catalyst, or mixture of catalyst and particulate solids diluent, with a low molecular weight hydrocarbon feed comprising methane, a steam feed, and an oxygen feed to produce partial oxidation and steam reforming reactions, with localized burning and excessive heat generation at the location of oxygen injection caused by reaction between the oxygen and hydrocarbon feeds which surface melts the solids particles and increases their intrinsic rate of agglomeration to produce dense, high strength solids particles on repetitive passage thereof through the burning zone, the improvement comprising injecting the feeds into the fluidized bed of the reaction zone at mechanical energy input level in the range from about 2000 ft-lbs to about 6000 ft-lbs, per pound of oxygen sufficient to balance the intrinsic rate of agglomeration by fracturing and breaking up in situ the agglomerated catalyst to maintain the fluidized characteristics of the bed of catalyst throughout the cycle of operation.

2. The process of claim 1 wherein the mechanical energy input of the feeds injected into the fluidized bed of the reaction zone ranges from about 3000 ft-lbs to about 5000 ft-lbs, per pound of oxygen.

3. The process of claim 1 wherein at least about 70 percent, and greater, of the total mechanical energy input required to break up the agglomerated catalyst is supplied by injection of the low molecular weight hydrocarbon, oxygen and steam feeds into the reaction zone.

4. The process of claim 1 wherein at least about 80 percent, and greater, of the total mechanical energy input required to break up the agglomerated catalyst is supplied by the low molecular weight hydrocarbon, the oxygen and steam feeds.

5. The process of claim 1 wherein throughout the operation at least about 80 percent to about 95 percent of the solids particles of the fluidized bed are maintained at particle diameters ranging from about 20 microns to about 130 microns, based on the weight of the fluidized bed solids.

6. The process of claim 5 wherein the particle diameters of the bed solids range from about 30 microns to about 110 microns.

7. The process of claim 1 wherein the strength of the solids particles withdrawn from the fluidized bed of the reaction zone, expressed in terms of the Davison Attrition Index, D.I., is less than about 6 D.I.

8. The process of claim 7 wherein the strength of the particles ranges from about 1.5 D.I. to about 2.5 D.I.

9. The process of claim 8 wherein the strength of the particles ranges from about 0.5 D.I to about 2 D.I.

10. The process of claim 1 wherein the oxygen fed into the reaction zone is diluted to aid in moderating the heat of reaction, the molar ratio of diluent:oxygen ranging from about 0.1:1 to about 0.6:1.

11. The process of claim 10 wherein the molar ratio of diluent:oxygen ranges from about 0.3:1 to about 0.5:1.

12. The process of claim 10 wherein a steam diluent is added to the oxygen.

13. In a process for the production of hydrogen and carbon monoxide by contact in a reaction zone at high temperature of a fluidized bed of a particulate solids catalyst, or mixture of catalyst and particulate solids diluent, with a low molecular weight hydrocarbon feed comprising methane, a steam feed, and an oxygen feed to produce partial oxidation and steam reforming reactions, with localized burning and excessive heat generation at the location of oxygen injection caused by reaction between the oxygen and hydrocarbon feeds which surface melts the solids particles and increases their intrinsic rate of agglomeration to produce dense, high strength solids particles on repetitive passage thereof through the burning zone, the improvement comprising injecting the feeds into the fluidized bed of the reaction zone at mechanical energy input level ranging from about 2000 ft-lbs to about 5000 ft-lbs per pound of oxygen to fracture and break up in situ the agglomerated catalyst and maintain at least about 80 percent to about 95 percent of the solids particles of the bed at diameters ranging from about 20 microns to about 130 microns, based on the weight of the fluidized bed solids, throughout the cycle of operation.

14. The process of claim 13 wherein the mechanical energy input level of the feeds ranges from about 3000 ft-lbs to about 4000 ft-lbs, per pound of oxygen, and the solids particles of the bed are of diameters ranging from about 30 microns to about 110 microns.

15. The process of claim 13 wherein the low molecular weight hydrocarbon-feed is a mixture of $C_1$-$C_4$ alkanes, predominantly methane, the catalyst is a nickel-on-alpha alumina catalyst, the particulate solids diluent is alpha alumina, and the temperature of the reaction zone ranges from about 1500° F. to about 1900° F.

16. The process of claim 15 wherein the mixture of $C_1$-$C_4$ alkanes is natural gas, and the total mechanical energy input of the feeds injected into the reaction zone ranges from about 2000 ft-lbs to about 5000 ft-lbs, per pound of oxygen.

17. The process of claim 13 wherein the strength of the solids particles withdrawn from the fluidized bed of the reaction zone, expressed in terms of the Davison Attrition Index, D.I., is less than about 6 D.I.

18. The process of claim 17 wherein the strength of the particles ranges from about 1.5 D.I. to about 2.5 D.I.

19. The process of claim 18 wherein the strength of the particles ranges from about 0.5 D.I. to about 2 D.I.

* * * * *